Patented Oct. 8, 1946

2,408,996

UNITED STATES PATENT OFFICE 2,408,996

CATALYST REJUVENATION

Robert L. Parker, Jr., South Pasadena, and Hal C. Huffman, Long Beach, Calif., assignors to Union Oil Company of California, Los Angeles, Calif., a corporation of California No Drawing. Application June 9, 1943, Serial No. 490,226

6 Claims. (Cl. 196—52)

This invention relates to the restoration of the activity of catalysts which have suffered apparently permanent loss of activity in service.

In carrying out catalytic processes, such as dehydrogenation of hydrocarbons, for example, the process is usually operated in cycles. In one form of such operation, the hydrocarbons are dehydrogenated during the reaction period of each cycle, by passage at an elevated reaction temperature over a bed of the catalyst until the activity of the catalyst as measured by the percent of olefins in the product, has decreased to a predetermined limit, the decline in activity being due, presumably, to deposition of carbonaceous material. The hydrocarbon feed is then discontinued and the catalyst is regenerated by heating it in the presence of an oxygen-containing gas, whereby the carbonaceous deposit is removed by oxidation. The activity of the catalyst is thereby restored, and the catalyst is ready for another cycle of operation. After a number of such cycles of operation, however, it becomes apparent that even when freshly regenerated the activity of the catalyst has declined somewhat from its initial value, and this decline generally continues until a point has been reached at which further use is not economically desirable. At this stage the spent catalyst is replaced by fresh material. The spent catalyst is of little value except for possible recovery of expensive chemicals therefrom. Since each batch of catalyst may cost many thousands of dollars, such catalyst replacement may constitute an appreciable proportion of the cost of of a catalytic process.

Similar degeneration of catalysts occurs in other forms of operation, employing movable bed catalysts, fluid catalysts, etc., and in other processes such as "hydroforming" which refers to catalytic reforming in the presence of hydrogen as well as other catalytic processes, such as hydrogenation, desulfurization, aromatization, cracking and the like. These are all hydrocarbon conversion processes which involve changing the carbon-hydrogen ratio of the hydrocarbons involved. The normal reaction temperature for specific processes of these types generally lies between 200° C. and 800° C., usually between 400° C. and 600° C., and the regeneration of the catalysts is usually carried out at a maximum temperature of about 100° C. above the normal reaction temperature.

It has also been observed that many catalysts lose their activity to a very substantial degree on prolonged exposure to temperatures in the neighborhood of 700° C. to 1000° C. In fact, in some instances there appears to be a correlation between the rate of decline in activity of a catalyst in actual service, and its loss of activity on exposure to such temperatures, such as in calcination at 800° C. for six hours, for example.

We have now discovered a method whereby a catalyst which is apparently spent either by successive cycles of operation or by prolonged exposure to temperatures between about 700° C. and about 1000° C., may be readily restored to an activity approaching its initial activity. To distinguish this method from conventional regeneration methods, we shall refer to it as a rejuvenation process.

Briefly, the rejuvenation process of this invention involves heating a spent catalyst which is substantially free from carbon for a relatively short time to a temperature about 200° C. to 500° C. and preferably about 250° C. to 350° C. above its normal reaction temperature and desirably in the region of about 700° C. to about 900° C., and thereafter cooling it to the reaction temperature or a lower temperature as desired. The manner of cooling has been found to have a pronounced effect on the subsequent activity of the catalyst. In the preferred form, the catalyst is cooled slowly at a controlled substantially uniform rate, to the reaction temperature of about 500° C., after which it may be cooled further if and as desired.

The time for which the catalyst is held at its maximum temperature may vary with the temperature and also with the nature of the catalyst. A minute may be sufficiently long, especially at temperatures approaching 900° C., but 5 to 10 hours or more may be required at temperatures near 700° C. for some catalysts. At about 800° C., a time of about 5 to about 50 minutes is usually adequate. Too long exposure to these high temperatures is to be avoided, especially if rapid cooling is employed. It is preferable to limit the cooling rate to about one degree centigrade per minute, though higher cooling rates, such as up to about 5° C. per minute, or even about 5° C. to about 50° C. per minute as in the rapid cooling rejuvenation, may be employed in some instances, especially at the higher temperatures. Lower rates of cooling, such as about 0.5° C. per minute or even 0.1° C. per minute or less, may be employed to advantage for lower temperatures.

The proper rates of cooling may be attained either by providing a cooling zone so well insulated that removal of heat, such as by circulation of a cooling medium is required, or by providing a moderately insulated cooling zone in which the normal loss of heat to the atmosphere would provide a greater rate of cooling than desired, and controlling the cooling rate by addition of heat to the cooling zone. Combinations of these processes or analogous processes may also be employed. Normally catalytic systems are provided with means for heating and also with means for cooling, and only limited modifications of the equipment would be necessary to provide for the higher temperatures required in the rejuvenation, the slow cooling, and the maintenance of a substantially uniform cooling rate.

The rejuvenation process may be applied to any stable solid catalyst, i. e. any solid catalyst which will not decompose, melt, or vaporize under the rejuvenation conditions. These include metal alloys, oxides, sulfides, and the like. The metal oxides are preferred, and these include mixtures of metal oxides, metal oxide compounds of more than one metal such as cobalt molybdate, metal oxide carriers activated by other metals or oxides, such as chromic oxide on alumina, molybdic oxide on alumina-silica, cobalt molybdate on zirconia, and the like. The metals involved may be metals of group I such as copper and silver, metals of group II, such as beryllium and zinc, metals of group III such as aluminum and boron, metals of the left-hand column of group IV such as titanium and zirconium, metals of the right-hand column of group IV such as silicon and tin, metals of group V such as vanadium and columbium, metals of group VI such as chromium and molybdenum, metals of group VII such as manganese and masurium and metals of group VIII such as iron, cobalt and nickel. Particularly effective are the oxides of the metals of group III and group VI, and the oxides of the metals of atomic numbers 22 to 30, inclusive. The process is especially applicable to catalysts which consist predominantly of alumina, especially when these are activated by oxides of metals of group VI or group VIII, or by oxides of metals of atomic number 22 to 30 inclusive, i. e. Ti, V, Cr, Mn, Fe, Co, Ni, Cu, and Zn, or by oxides of metals of both groups II and VI.

The rejuvenation is preferably carried out in an atmosphere which is predominantly nitrogen, such as air or flue gases, preferably containing some oxygen, although it may also be carried out in atmospheres such as pure nitrogen, water vapor, carbon dioxide, hydrogen, or carbon monoxide, or mixtures of these, or the like. The catalyst is preferably regenerated until substantially free from carbonaceous material prior to the treatment, although it is possible in some instances in which an oxidizing atmosphere is employed, to accomplish the regeneration in the early stages of the heating period prior to the attainment of the maximum temperature in the rejuvenation process.

The following are examples of our process:

Example 1

A dehydrogenation catalyst composed of alumina containing small amounts (about 5% each) of chromium and beryllium oxides was spent by employing it in 239 two-hour operating cycles in each cycle of which it was used to dehydrogenate n-butane at 1050° F. during one hour and regenerated during the next hour. The average conversion to butenes during the last few cycles of this series was about 70% of that attained during the first few cycles. This spent catalyst was regenerated as usual, burning off the accumulated "carbon" i. e. carbonaceous material, with air at a maximum temperature of about 1200 to 1250° F. One portion of this substantially carbon-free catalyst was set aside for testing as described below, a second portion was rejuvenated with slow cooling, by heating it in an air oven at 800° C. for 15 minutes, then cooling it to 500° C. at a substantially uniform rate over a period of about 5 hours; and a third portion was rejuvenated with rapid cooling, by heating it in an air oven at 800° C. for 15 minutes, followed by removal from the oven and rapid cooling to room temperature. The three portions of the spent catalyst, as well as a portion of the fresh original catalyst were each tested for activity in a dehydrogenation operation carried out at 1050° F., employing a stock consisting of about 90% n-butane, 8% i-butane, and 2% propane and pentanes. The average conversion of butenes over a 2-hour period, as determined by bromination of samples of the product taken at frequent intervals, was 33.3% for the fresh catalyst, 22.8% for the regenerated spent catalyst, 32.3% for the rejuvenated slowly-cooled catalyst, and 30.8% for the rejuvenated rapidly-cooled catalyst. Thus, a catalyst which had lost about a third of its original activity, and could not be regenerated to better this degree of activity, was rejuvenated to 93 to 97% of its initial activity by our processes.

Example 2

Another sample of the fresh catalyst of Example 1 above was calcined in an air oven for 6 hours at 800° C. Half of the catalyst was cooled rapidly thereafter, and the other half was cooled slowly at an average rate of about 1° C. per minute to 500° C., and thereafter cooled rapidly. Upon testing, as in Example 1, the rapidly cooled calcined catalyst was found to have only about 66% of the activity of the fresh catalyst, while the slowly cooled calcined catalyst exhibited 84% of the activity of the fresh catalyst. Note that the rejuvenation in this case was effective on a catalyst which had never been deactivated with carbonaceous material.

Example 3

A hydroforming catalyst consisting of alumina containing about 9% of molybdic oxide was spent by employing it in about 350 five-hour operating cycles. During each cycle it was used to hydroform a gasoline fraction at 950° F. during two hours of the cycle and regenerated during the next three hours. At this stage in its life the catalyst had an activity of about 70% of that shown initially. A portion of this spent (freshly regenerated) catalyst was set aside for testing, and a second portion was rejuvenated with slow cooling, the rejuvenating involving heating it to 800° C. in an air oven, maintaining it at this temperature for ten minutes, and cooling it to about 500° C. at a substantially uniform rate over a period of about 5 hours, thereafter cooling it quickly to room temperature. The two catalyst portions as well as a fresh portion of the same catalyst were tested for hydroforming activity by employing each of them in a 2-hour operation in which a feed stock consisting of a 200 to 270° F. boiling range gasoline containing 14% aromatic hydrocarbons, the remainder being naphthenes and paraffins, was vaporized and passed over the catalyst at a rate of one volume (of liquid feed) per volume of catalyst per hour, together with about 3400 cubic feet of hydrogen per barrel of feed, at a temperature of 950° F. and a pressure of 100 lbs. per square inch. The net make of aromatic hydrocarbons (percent. aromatics in the product times the fraction of the feed recovered minus the percent. aromatics in the feed) was 32% for the fresh catalyst, 22.7% for the regenerated spent catalyst, and 28.6% for the rejuvenated spent catalyst.

Example 4

A hydroforming catalyst consisting of about 20% of cobalt molydate and about 80% alumina, prepared by precipitation of the cobalt molybdate on a previously precipitated and undried alumina gel, was spent by employing it in operations similar to those of Example 3 above. A portion of the spent regenerated catalyst was rejuvenated with slow cooling and with rapid cooling as in Example 1, and on testing for activity as in Example 3, the regenerated spent catalyst was found to have approximately 60% of its initial activity; the spent catalyst rejuvenated with rapid cooling had over 85% of its initial activity, and the spent catalyst rejuvenated with slow cooling had over 95% of its initial activity.

No explanation for the effectiveness of the rejuvenation process is offered. It is believed that definite chemical changes are involved, however, and marked physical changes occur in some instances. For example, on rejuvenation, the cobalt molybdate-alumina catalyst described above was changed in color from a typical black tinged with blue or green, to a vivid blue bordering on purple.

The term "spent catalyst" as employed herein is intended to include any catalyst which has lost a substantial degree of its initial activity in use.

Modifications of this invention which would occur to one skilled in the art are to be considered part of the invention as defined in the following claims.

We claim:

1. A process for changing the carbon-hydrogen ratio of hydrocarbon oils which comprises subjecting said hydrocarbons to an elevated temperature sufficient to cause the desired reaction in the presence of a catalyst for a reaction period in which the catalyst becomes coated with a carbonaceous deposit, subjecting the used catalyst to a regeneration treatment in which said carbonaceous deposit is removed at a temperature not more than about 100° C. higher than the reaction temperature, repeating the above cycle of operation until the catalyst becomes spent and its activity after regeneration is substantially lower than its original activity, rejuvenating the spent regenerated catalyst by heating it to a temperature between about 700° C. and 900° C. for a period between about one minute and about 10 hours and thereafter cooling the catalyst to said reaction temperature at a rate not in excess of about 5° C. per minute, and subjecting said hydrocarbons to said reaction in the presence of ths thus rejuvenated catalyst.

2. A process for changing the carbon-hydrogen ration of hydrocarbon oils which comprises subjecting said hydrocarbon oils to a reaction temperature between about 200° C. and about 600° C. in the presence of a catalyst for a reaction period in which the catalyst becomes coated with a carbonaceous deposit, subjecting the used catalyst to a regeneration treatment in which said carbonaceous deposit is removed at a temperature below about 700° C., repeating the above cycle of operation until the catalyst becomes spent and its activity after regeneration is substantially lower than its original activity, rejuvenating the spent regenerated catalyst by heating it to a temperature between about 700° C. and 900° C. for a period between about one minute and about 10 hours and thereafter cooling the catalyst to said reaction temperature at a rate not in excess of about 5° C. per minute, and subjecting said hydrocarbon oils to said reaction in the presence of the thus rejuvenated catalyst.

3. A process according to claim 1 in which the rejuvenation is carried out in the presence of air.

4. A process according to claim 1 in which the reaction is carried out in the presence of hydrogen.

5. A process according to claim 2 in which the catalyst consists predominantly of alumina.

6. A process according to claim 2 in which the rate of cooling is a substantially uniform rate not in excess of about 1° C. per minute.

ROBERT L. PARKER, Jr.
HAL C. HUFFMAN.